R. R. LEFFLER.
FLAT SLAB PAN.
APPLICATION FILED NOV. 21, 1919.

1,410,328.

Patented Mar. 21, 1922.

Inventor,
Ralph R. Leffler
By Hull Smith Brock & West
Att'ys.

UNITED STATES PATENT OFFICE.

RALPH R. LEFFLER, OF CLEVELAND, OHIO, ASSIGNOR TO THE HYDRAULIC PRESSED STEEL COMPANY, OF CLEVELAND, OHIO, A CORPORATION OF OHIO.

FLAT-SLAB PAN.

1,410,328.  Specification of Letters Patent.  Patented Mar. 21, 1922.

Application filed November 21, 1919. Serial No. 339,714.

*To all whom it may concern:*

Be it known that I, RALPH R. LEFFLER, a citizen of the United States, residing at Cleveland, in the county of Cuyahoga and State of Ohio, have invented a certain new and useful Improvement in Flat-Slab Pans, of which the following is a full, clear, and exact description, reference being had to the accompanying drawings.

This invention relates generally to pans employed in the construction of concrete buildings and more particularly to what is known as a flat slab pan. The object of the invention is to provide a pan which will be simple in construction, easy to manufacture, and exceedingly strong and durable, thereby reducing the damage due to hard usage to a minimum. Another object of the invention is to provide a flat slab pan which will lend itself readily to various types of supporting devices and which will be particularly adapted for use in connection with wedge forms of spacing or filler strips between the pans.

Figure 1:
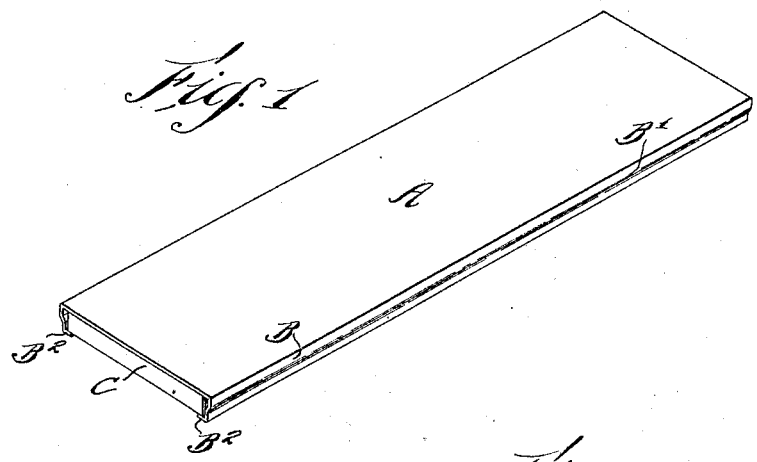
Figure 2:
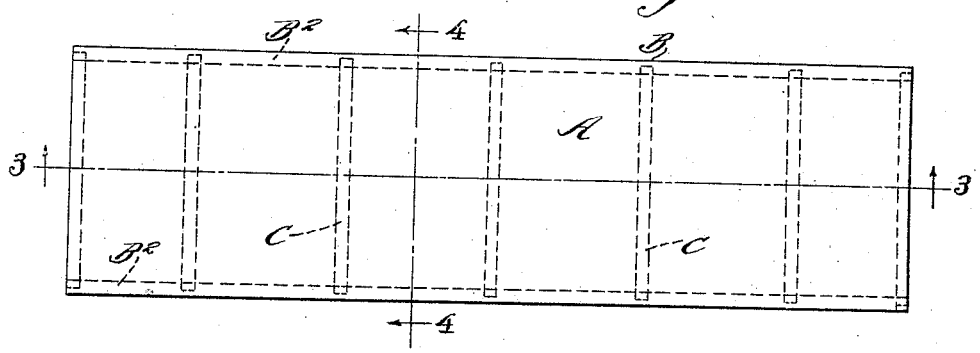
Figure 3:
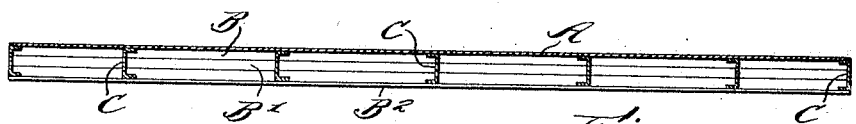
Figure 4:
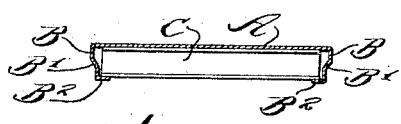

With these various objects in view the invention consists in the novel features of construction hereinafter fully described and set forth in the appended claims. In the drawings forming a part of this specification Fig. 1 is a perspective view of a flat slab pan constructed in accordance with my invention; Fig. 2 is a top plan view of the same; Fig. 3 is a section on the line 3—3 of Fig. 2; and Fig. 4 is a section on the line 4—4 of Fig. 2.

In the practical embodiment of my invention I employ a flat plate of sheet metal which is pressed to provide the flat top A and integral sides B which are pressed inwardly towards their lower edges as shown at B' and terminate in inwardly extending bottom flanges B². Transverse channel strips C are arranged at each end of the pan and at regular intervals intermediate the ends, said transverse strips resting upon the bottom flanges and also contacting with the top of the pan thereby strengthening the pan as a whole from end to end. These channel strips can be connected by welding, riveting or any other suitable method. A flat slab pan constructed as herein shown can be very easily manufactured and owing to the configuration of the size and the transverse brazing it will be exceedingly strong and durable and therefore will not be damaged to any appreciable extent of the rough usage to which such pans are ordinarily subjected.

Having thus described my invention, what I claim is:—

1. A slab form pan comprising a top and integral side members, said side members being pressed inwardly toward their lower ends and terminating in inwardly extending flanges.

2. A slab form pan comprising a top and integral side members, said side members being pressed inwardly toward their lower ends and terminating in inwardly extending flanges, and a plurality of transverse channel strips fixedly arranged between the side members.

3. A flat slab pan comprising a top and integral side members terminating in inwardly extending flanges and a plurality of transverse channel strips arranged between the top, sides and flanges as set forth.

4. A panel for concrete work comprising a sheet metal plate having opposite edge portions thereof bent at an angle with respect to the main body of the plate, at least one of said bent over portions having a longitudinally extending bead or rib member, said bead being located adjacent the point of juncture of the main body of the plate and said bent over portion.

In testimony whereof I hereunto affix my signature.

RALPH R. LEFFLER.